United States Patent
Yageta et al.

(10) Patent No.: US 6,686,092 B2
(45) Date of Patent: Feb. 3, 2004

(54) NONAQUEOUS ELECTROLYTE TYPE SECONDARY BATTERY WITH A FILM CASING

(75) Inventors: Hiroshi Yageta, Tokyo (JP); Tatsuji Numata, Tokyo (JP); Chika Kanbe, Tokyo (JP); Akira Kobayashi, Tokyo (JP); Masato Shirakata, Tokyo (JP); Masatomo Yonezawa, Tokyo (JP)

(73) Assignee: NEC Corporation, Tokyo (JP)

( * ) Notice: Subject to any disclaimer, the term of this patent is extended or adjusted under 35 U.S.C. 154(b) by 108 days.

(21) Appl. No.: 09/735,357

(22) Filed: Dec. 12, 2000

(65) Prior Publication Data
US 2001/0018149 A1 Aug. 30, 2001

(30) Foreign Application Priority Data
Dec. 16, 1999 (JP) ............................................. 11-357685

(51) Int. Cl.$^7$ .......................... H01M 4/50; H01M 4/52; H01M 4/62
(52) U.S. Cl. .................... 429/224; 429/223; 429/57; 429/59
(58) Field of Search .......................... 429/57, 59, 127, 429/224, 223, 248

(56) References Cited
U.S. PATENT DOCUMENTS 5,429,890 A * 7/1995 Pynenburg et al.
5,783,333 A * 7/1998 Mayer .......................... 429/223
6,048,639 A * 4/2000 Sonozaki et al. ............ 429/127
6,399,241 B1 * 6/2002 Hara et al. ................... 429/163

FOREIGN PATENT DOCUMENTS

| JP | 56-167274 | | 12/1981 |
| JP | 06-111819 | | 4/1994 |
| JP | 6-275263 | | 9/1994 |
| JP | 10-112318 | * | 4/1998 |
| JP | 11-071115 | | 3/1999 |
| JP | 11-97072 | | 4/1999 |
| JP | 2000-077097 | * | 3/2000 |

* cited by examiner

Primary Examiner—Patrick Ryan
Assistant Examiner—Tracy Dove
(74) Attorney, Agent, or Firm—Michael Best & Friedrich LLP (57) ABSTRACT

A secondary battery including an electricity generating element, which includes at least a positive electrode implemented by a lithium-manganese compound oxide, a negative electrode, an electrolyte and a separator, and films encasing the electricity generating element is disclosed. The secondary battery further includes a composition causing the electrolyte to react with water to thereby produce hydrogen ions, and a hydrogen ion uptaking agent so positioned as to contact the electrolyte existing in the battery. The battery is desirable in charge-discharge cycle characteristic, storage characteristic, and safety. In addition, the battery swells little despite a repeated charge-discharge cycle or storage.

4 Claims, 7 Drawing Sheets

|  | $LiNi_{0.9}Co_{0.1}O_2$ MIXTURE RATIO a | Mn CONCENTRATION IN ELECTROLYTE |
|---|---|---|
| EXAMPLES | 1% | 1901 ppm |
|  | 2% | 1797 ppm |
|  | 3% | 623 ppm |
|  | 5% | 519 ppm |
|  | 10% | 23 ppm |
|  | 15% | 4.2 ppm |
|  | 20% | 0.2 ppm OR BELOW |
| COMPARATIVE EXAMPLES | 0% | 2320 ppm |

FIG. 4

|  | $LiNi_{0.9}Co_{0.1}O_2$ MIXTURE RATIO a | Li CONCENTRATION IN ELECTROLYTE |
|---|---|---|
| EXAMPLES | 1% | 5572 ppm |
|  | 2% | 5610 ppm |
|  | 3% | 6372 ppm |
|  | 5% | 6364 ppm |
|  | 10% | 6402 ppm |
|  | 15% | 6418 ppm |
|  | 20% | 6397 ppm |
| COMPARATIVE EXAMPLES | 0% | 5577 ppm |

FIG. 5

| CYCLE ESTIMATION TEMPERATURE (°C) | #50/#1 RESIDUAL CAPACITY RATIO (%) | |
|---|---|---|
| | EXAMPLE | COMPARATIVE EXAMPLE |
| 10 | 94 | 92 |
| 20 | 93 | 91 |
| 30 | 92 | 88 |
| 40 | 91 | 84 |
| 50 | 89 | 76 |
| 60 | 89 | 73 |

| | x | a | 4W CAPACITY (mAh) | 4W CAPACITY/ 0W CAPACITY (%) |
|---|---|---|---|---|
| EXAMPLES | 4 | 5 | 1381 | 93 |
| | 8 | 10 | 1438 | 94 |
| | 12 | 15 | 1500 | 94 |
| | 16 | 20 | 1540 | 95 |
| | 20 | 25 | 1582 | 95 |
| | 24 | 30 | 1625 | 95 |
| | 28 | 35 | 1672 | 96 |
| | 32 | 40 | 1735 | 95 |
| | 36 | 45 | 1762 | 95 |
| | 40 | 50 | 1796 | 95 |
| | 44 | 55 | 1847 | 96 |
| | 48 | 60 | 1889 | 96 |
| COMPARATIVE EXAMPLE | 0 | 0 | 1192 | 82 |

FIG. 8

| | x | a | OVERCHARGE TEST | NAIL DRIVE TEST |
|---|---|---|---|---|
| EXAMPLES | 4 | 5 | NO SMOKE OR FIRE | NO SMOKE OR FIRE |
| | 8 | 10 | NO SMOKE OR FIRE | NO SMOKE OR FIRE |
| | 12 | 15 | NO SMOKE OR FIRE | NO SMOKE OR FIRE |
| | 16 | 20 | NO SMOKE OR FIRE | NO SMOKE OR FIRE |
| | 20 | 25 | NO SMOKE OR FIRE | NO SMOKE OR FIRE |
| | 24 | 30 | NO SMOKE OR FIRE | NO SMOKE OR FIRE |
| | 28 | 35 | NO SMOKE OR FIRE | NO SMOKE OR FIRE |
| | 32 | 40 | NO SMOKE OR FIRE | NO SMOKE OR FIRE |
| | 36 | 45 | NO SMOKE OR FIRE | NO SMOKE OR FIRE |
| | 40 | 50 | NO SMOKE OR FIRE | SOME VAPOR |
| | 44 | 55 | NO SMOKE OR FIRE | SMOKE |
| | 48 | 60 | NO SMOKE OR FIRE | SMOKE |
| COMPARATIVE EXAMPLE | 0 | 0 | NO SMOKE OR FIRE | NO SMOKE OR FIRE |

| SPECIFIC SURFACE AREA (m²/g) | SLURRY VISCOSITY (cps) | SLURRY CONDITION | ELECTRODE COATED CONDITION |
|---|---|---|---|
| 4.5 | 22000 | GEL | NO GOOD |
| 3.2 | 18000 | GEL | NO GOOD |
| 3.0 | 6000 | UNIFORMLY DISPERSION | GOOD |
| 1.5 | 5000 | UNIFORMLY DISPERSION | GOOD |
| 0.3 | 4000 | UNIFORMLY DISPERSION | GOOD |

FIG. 11

| | EXAMPLE | COMPARATIVE EXAMPLE |
|---|---|---|
| INITIAL | 8.9mm | 8.9mm |
| AFTER 100 CYCLES | 10.7mm | 11.7mm |

FIG. 12

| | EXAMPLE | COMPARATIVE EXAMPLE |
|---|---|---|
| INITIAL | 8.9mm | 8.9mm |
| IN 28 DAYS AT 60°C | 10.9mm | 11.9mm |

NONAQUEOUS ELECTROLYTE TYPE SECONDARY BATTERY WITH A FILM CASING

BACKGROUND OF THE INVENTION

The present invention relates to a nonaqueous electrolyte type secondary battery including an electricity generating element accommodated in a film casing and more particularly to a nonaqueous electrolyte type secondary battery configured to swell little.

A secondary battery of the type described is conventional and includes an electricity generating element and a casing accommodating the electricity generating element. The casing is implemented by two aluminum laminate films each consisting or aluminum foil and a thermo-bonding resin film formed on the aluminum foil. Metallic leads protrude from the inside to the outside of the casing via the bonded portion of the casing. Today, there is an increasing demand for a thin, light battery configuration capable of implementing a thin, light electric apparatus. In this sense, the battery accommodated in the film casing is advantageous over a battery accommodated in a hard metallic casing.

The battery with the film casing needs more strict safety implementations than the battery with the hard metallic casing. For example, the battery should undergo a minimum of deformation in contour. Of course, the battery with the film casing should have an ability generally required of a battery, e.g., high energy density (high charge-discharge capacity), a high cycle characteristic, and a storage capacity characteristic despite self-discharge.

Lithium manganate is attracting increasing attention as one of positive electrode substances for a lithium ion secondary battery. Lithium manganate has a spinel structure represented by $LiMn_2O_4$ and functions as a 4V class, positive electrode substance in relation to a $\lambda$-$MnO_2$ composition. Lithium manganate with the spinel structure has a tridimensional host structure different from a layer structure particular to, e.g., $LiCoO_2$, so that most of stoichiometric capacity available therewith can be used. Lithium manganate is therefore expected to have a desirable cycle characteristic.

Further, lithium manganate with the spinel structure allows lithium ions to be pulled out while maintaining its basic frame. This compound therefore starts releasing oxygen at a higher temperature than cobalt acid lithium having a layer, halite structure and is expected to be desirable from the safety standpoint. The safety feature is particularly important when it comes to the battery with the soft film casing- In practice, however, a lithium secondary battery including a positive electrode implemented by lithium manganate has a problem that its capacity decreases little by little due to repeated charging and discharging. This problem is serious in the aspect of practical use.

Various schemes have heretofore been proposed to improve the cycle characteristic of an organic electrolyte type secondary battery whose positive electrode is implemented by lithium manganate. For example, Japanese Patent Laid-Open Publication Nos. 3-67464, 3-119656, 3-127453, 7-245106 and 7-73883 teach improvements achievable by improving reactiveness at the time of production. Also, Japanese Patent Laid-Open Publication Nos. 4-198028, 5-28307, 6-295724 and 7-97216 teach improvements achievable by controlling a grain size. Further, Japanese Patent Laid-Open Publication No. 5-21063 teaches an improvement attainable by removing impurities. None of such schemes, however, achieves a satisfactory cycle characteristic.

Japanese Patent Laid-Open Publication No. 2-270268 proposes to improve the cycle characteristic by selecting an Li composition ratio sufficiently greater than a stoichiometric ratio. This kind of scheme is disclosed in, e.g., Japanese Patent Laid-Open Publication Nos. 4-123769, 4-147573, 5-205744 and 7-282798 also. Experiments actually indicated the improvement in cycle characteristic achievable with such a scheme.

Japanese Patent Laid-Open Publication Nos. 6-338320 and 7-262984, for example, each use $LiMn_2O_4$, which is a Mn spinel substance, and $Li_2Mn_2O_4$, $LiMnO_2$, $Mi_2MnO_3$ or similar Li-Mn compound oxide, which is richer than the above Mn spinel substance, as a positive electrode active substance. However, adding excessive Li or mixing it with another Li-rich compound reduces the charge-discharge capacity and charge-discharge energy although improving the cycle characteristic. As a result, high energy density and long cycle life are not compatible with each other. By contrast, Japanese Patent Laid-Open Publication No. 6-275276 proposes to increase a specific surface area for achieving a high rate, charge-discharge characteristic (great current relative to capacity at the time of charging and discharging) and perfect reaction. This, however, obstructs an increase in cycle life.

On the other hand, it has been studied to improve the characteristics by adding another element to a Li-Mn-O compound. For example, Japanese Patent Laid-Open Publication Nos. 4-141954, 4-160758, 4-169076, 4-237970, 4-282560, 4-289662, 5-28991 and 7-14572 each propose to add or dope, e.g., Co, Ni, Fe, Cr or Al. However, the addition of such a metal element reduces the charge-discharge capacity and needs further studies to satisfy the total ability.

As for the addition of another element, boron is expected to improve the other characteristics, e.g., cycle characteristic and self-discharge characteristic while degrading the charge-discharge characteristic little. This described in, e.g., Japanese Patent Laid-Open Publication Nos. 2-253560, 3-297058, and 9-115515. In any case, a manganese dioxide or a lithium-manganese compound oxide is mixed with a boron compound (e.g. boric acid) in a solid phase or immersed in an aqueous solution of a boron compound and then heated, thereby producing a lithium-manganese compound oxide. The resulting compound powder of boron compound and manganese oxide decreases in surface activity and is expected to suppress reaction with an electrolyte and therefore to improve the storage characteristic.

The addition of boron, however, reduced the growth of particles and tap density and did not directly translate into high capacity required of a battery alone. Moreover, capacity decreased in the valid potential range when boron was combined with a carbon negative electrode, or the reaction of boron with an electrolyte could not be sufficiently suppressed, depending on the synthesizing conditions. Boron therefore did not satisfactorily improve the storage characteristic.

On the other hand, lithium manganate applied to the positive electrode of the battery with the film casing did not satisfy the expected degree of safety. Specifically, when the battery was repeatedly charged and discharged or left in a charging state at a high temperature, gases were generated in the battery and raised the pressure inside the battery, causing the battery to easily swell. The above gases are presumably ascribable to the decomposition of the electrolyte The swell of the contour of the battery is apt to exceed a space allocated thereto when mounted to an electric apparatus, exerting pressure on surrounding parts. In the worst case, the gases bring about the dangerous burst of the battery.

As stated above, although lithium manganate is a hopeful compound oxide capable of replacing $LiCoO_2$, which is the predominant positive electrode active substance, the conventional battery using lithium manganate has the following problems (1) through (3) left unsolved.

(1) High energy density (high charge-discharge capacity) and high cycle life are not easily compatible.

(2) Storage capacity decreases due to self-discharge.

(3) When the battery with the film casing and using $LiMn_2O_4$ is repeatedly charged and discharged or held in a charging state in a high temperature environment, gases presumably ascribable to the decomposition of the electrolyte are generated and cause the battery to swell.

Technical problems relating to the production of a battery and the compatibility of lithium manganate with an electrolyte have been pointed out as the causes of the above problems (1) through (3). Paying attention to the material of the positive electrode itself and the influence of the material, the above problems may be accounted for, as will be described hereinafter.

(1) Compatibility of High Energy Density and High Cycle Life

As for the decrease in capacity ascribable to the charge-discharge cycle, the mean valence of Mn ions varies between trivalence and tetravalence as charge compensation derived from the ingress and egress of Li. As a result, Jahn-Teller distortion occurs in crystal. In addition, Mn is eluted from lithium manganate, or impedance increases as a result of the Mn elution. More specifically, the decrease in capacity ascribable to repeated charge-discharge cycle is brought about mainly by the following causes:

(a) influence of impurities;

(b) elution of Mn from lithium manganate and precipitation of eluted Mn on a negative electrode active substance or on separator;

(c) inactivation ascribable to the isolation of active substance particles;

(d) influence of acids derived from contained water; and (e) deterioration of an electrolyte ascribable to the release of oxygen from lithium manganate.

Assume that a single spinal phase is formed. Then, Mn is eluted presumably because trivalent Mn partly changes into tetravalent Mn and divalent Mn and causes Mn to be easily dissolved in an electrolyte, and because the relative amount of Li ions becomes short. Presumably, repeated charging and discharging accelerates the generation of irreversible capacity and disturbance to the atomic arrangement of crystal, while causing the eluted Mn ions to precipitate on the negative electrode or on the separator and obstruct the migration of Li ions. Furthermore, the cubic symmetry of lithium manganate is distorted due to the ingress and egress of Li on the basis of the Jahn-Teller effect, resulting in the expansion or contraction of the unit lattice length by several percent. Consequently, the repeated charge-discharge cycle may even make electric contact partly defective or may prevent the isolated particles from functioning as an electrode active substance.

Furthermore, the elution of Mn presumably promotes the release of oxygen from lithium manganate. Lithium manganate with many oxygen defects is increased in 3.3 V Plato capacity and therefore deteriorated in cycle characteristic as the cycle is repeated. Also, the release of much oxygen presumably has adverse influence on the decomposition of an electrolyte and thereby deteriorates the cycle. It has been proposed to solve this problem by, e.g., improving the synthesizing method, adding another transitional element or enriching the Li composition. None of these schemes has succeeded to achieve both of high discharge capacity and high cycle life.

In light of the above, there may be reduced lattice distortion or reduced oxygen defects by way of example.

(2) Decrease in Storage Capacity Due to Self-Discharge

Regarding this problem, let the defective alignment of positive and negative electrodes ascribable to a production process and internal shorting derived from the entry of metal waste be excepted. Then, an improvement in storage characteristic is expected to enhance the stability of lithium manganate, i.e., to reduce Mn to be eluted, reaction with an electrolyte, and release of oxygen.

(3) Swell of Battery Using $LiMn_2O_4$

Presumably, the gases that cause the battery to swell are ascribable to an occurrence that Mn is precipitated on a negative electrode active substance and forms a high-resistance film on the surface or the substance. The high-resistance film is likely to promote the decomposition of an electrolyte on the surface of the negative electrode, resulting in the generation of hydrogen gas. Further, oxygen released from lithium manganate may produce oxygen gas, carbon monoxide gas and carbon dioxide gas on the surface of a positive electrode. Such gases cause the battery with the film casing to swell.

The above-described problems (1) through (3) become more serious in a high-temperature environment, preventing the applicable range from being extended. However, only a limited range of materials are available that implement potential, which satisfies performance required of the state-of-the-art high performance secondary battery, e.g., high electromotive force, flat voltage during discharge, cycle characteristic, and energy density. It is therefore necessary to realize new lithium manganate with spinel structure that obviates the deterioration of capacity ascribable to charging and discharging and has desirable cycle characteristic and storage characteristic.

Japanese Patent Laid-Open Publication No. 10-112318 teaches that a positive electrode active substance is implemented by a mixture of $LiMn_2O_4$ or similar lithium-manganese compound oxide and $LiNiO_2$ or similar lithium-nickel compound oxide. In accordance with this document, great charge-discharge capacity is achievable because irreversible capacity at the time of initial charging is made up for. Japanese Patent Laid-Open Publication No. 7-235291 also describes that $LiCo_{0.5}Ni_{0.5}O_2$ is introduced into $LiMn_2O_4$ in order to synthesize a positive electrode active substance.

We, however, experimentally found that the mixture of the lithium-manganese compound oxide and the lithium-nickel compound oxide did not satisfy the charge-discharge characteristic, particularly cycle life and capacity storage at high temperatures, or self-discharge characteristic alone. This is because not all the lithium-nickel compound oxides can uptake hydrogen ions, as will be described specifically later. That is, only a particular lithium-nickel compound oxide in accordance with the present invention can effectively obviate the deterioration of a lithium-manganese compound oxide or that of an electrolyte.

Moreover, the mixture of the lithium-manganese compound oxide and the lithium-nickel compound oxide was used as the positive electrode active agent of the battery including the film casing. The mixture, however, had no effect as to the swell of the battery ascribable to the charge-discharge cycle and the storage in a charging state (particularly at high temperatures) alone.

Technologies relating to the present invention are also disclosed in, e.g., Japanese Patent Laid-Open Publication Nos. 10-125323, 11-071115, 11-204110 and 11-297361, Japanese Patent Nos. 2512239, 2512241, 2517176, 2547137, 2584123, 2797526 and 2797528, and Japanese Patent Publication Nos. 7-70329, 7-73051 and 7-118317.

SUMMARY OF THE INVENTION

It is therefore an object of the present invention to provide a nonaqueous electrolyte type secondary battery with a film casing desirable in battery characteristic, particularly a charge-discharge characteristic and a storage characteristic, and safety and swelling little despite a repeated charge-discharge cycle or storage.

A secondary battery of the present invention includes an electricity generating element, which includes at least a positive electrode implemented by a lithium-manganese compound oxide, a negative electrode, an electrolyte and a separator, and films encasing the electricity generating element is disclosed. The secondary battery further includes a composition causing the electrolyte to react with water to thereby produce hydrogen ions, and a hydrogen ion uptaking agent so positioned as to contact the electrolyte existing in the battery.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

The principle of the present invention will be described first. In accordance with the present invention, in a non-aqueous electrolyte type secondary battery including an electricity generating element, which includes at least a positive electrode implemented by a lithium-manganese compound oxide, a negative electrode, an electrolyte and a separator, and films encasing the electricity generating element, a composition causing the electrolyte to easily react with water to thereby produce hydrogen ions is provided. A hydrogen ion uptaking agent is so positioned as to contact the electrolyte existing in the secondary battery.

In accordance with the present invention, the electrolyte contains a supporting electrolyte that is either one of $LiPF_6$ and $LiBF_4$.

We reached the present invention as a result of extended research and experiments directed toward the reduction of Mn to be eluted from the lithium-manganese compound oxide. Assume a nonaqueous electrolyte type secondary battery using a lithium-manganese compound oxide as a positive electrode active substance. Then, it is possible to determine the deterioration of the cycle characteristic by using a Mn ion concentration in an electrolyte as an index. Also, it is possible to determine the deterioration of the storage characteristic on the basis of a change in a Li ion concentration in the electrolyte. Gases causing the battery to swell are ascribable partly to the decomposition of the positive electrode active agent (elution of Mn and release of oxygen) and partly to Mn precipitated on the surface of a negative electrode and causing the electrolysis of the electrolyte. The generation of such gases can therefore be determined by use of a Mn ion concentration in the electrolyte.

We experimentally found that $LiPF_6$ or $LiBF_4$ used as the Li supporting salt caused Mn ions to be eluted in the electrolyte in a particularly great amount and increased the acidity of the electrolyte. Presumably, therefore, the supporting salt and a small amount of water existing in the organic electrolyte react with each other to generate hydrogen ions ($H^+$). Such hydrogen ions are considered to elute Mn contained in the lithium-manganese compound oxide and thereby deteriorate the crystal structure.

We considered that by locating a compound capable of uptaking hydrogen ions at a position where it could contact the electrolyte, a hydrogen ion concentration in the electrolyte and therefore the elution of Mn ions into the electrolyte could be reduced.

In fact, experiments showed that a hydrogen ion uptaking agent noticeably reduced Mn ions to be eluted into the electrolyte and suppressed a change in the Li ion concentration in the electrolyte. Further, the above agent successfully reduced the deterioration and color change of the electrolyte a well as the generation of acids and gases. The reduction in the amount of Mn ions to be eluted into the electrolyte translates into the reduction of release of oxygen from the lithium-manganese compound oxide. This not only protects the crystal structure of the compound oxide, but also obviates oxygen gas, carbon monoxide gas and carbon dioxide gas.

Consequently, the present invention improves the cycle characteristic while preserving high charge-discharge capacity, prevents impedance from increasing because of the reduction of decomposition of the electrolyte and a change in Li concentration, and obviates gases, which would cause the battery to swell.

Figure 1:
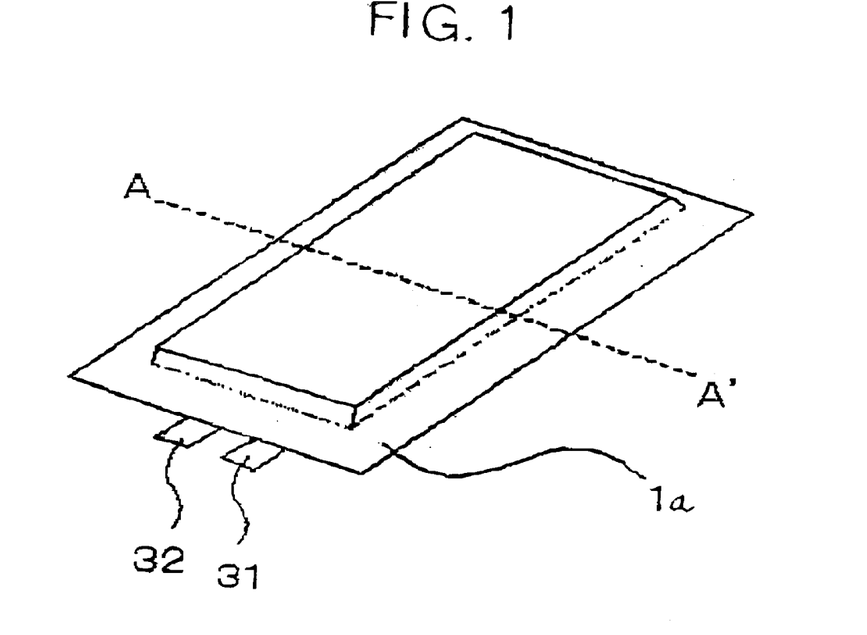
FIG. 1 is an isometric view showing a nonaqueous electrolyte type secondary battery embodying the present invention.
Figure 2:
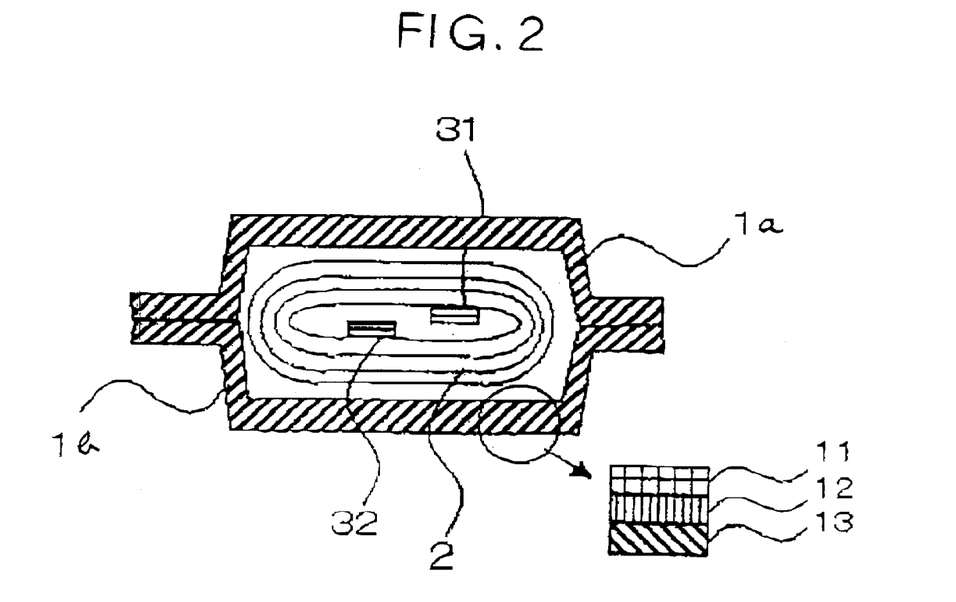
FIG. 2 is a sectional view of the secondary battery shown in FIG. 1.

Referring to FIGS. 1 and 2 of the drawings, a nonaqueous electrolyte type secondary battery embodying the present invention is shown. As shown, the secondary battery includes a winding type of electricity generating element (simply generating element hereinafter) 2. The generating element 2 is enclosed in a casing implemented by laminate films 1a and 1b. The laminate films 1a and 1b each consist of a thermo-bonding resin film 11, metal foil 12, and heat-resistant resin film 13 The laminate films 1a and 1b are-positioned such that their thermo-bonding resin films 11 face each other. The generating element 2 is bonded to the laminate films 1a and 1b at its four edges by heat with a positive lead 31 and a negative lead 32 protruding from one side of the element 2. The laminate films 1a and 1b each are molded in such a manner as to have a bottom and sides complementary to the contour of the generating element 2. The generating element 2 is impregnated with a nonaqueous electrolyte and includes a positive electrode, a negative electrode and a separator, not shown, as well as the electrolyte.

A hydrogen ion uptalcing agent applicable to the present invention reacts with hydrogen ions (H+) present in an organic electrolyte and lowers hydrogen ion concentration. The uptaking agent should preferably change, as a result of the reaction, into a compound or an inactive compound that does not affect the battery system. A hydrogen ion uptaking agent that produces water as a result of the above reaction is not feasible for the present invention because such water would produce hydrogen ions by again reacting with a supporting electrolyte. An alkali metal hydroxide for example, is not desirable because $OH^+$ ions react with hydrogen ions and produce water. A substance that increases the impedance of the battery to an excessive degree as a result of the reaction is not desirable either.

The hydrogen ion uptaking agent may be positioned anywhere in the battery so long as it contacts the electrolyte. For example, the uptaking agent may be mixed with or dissolved or dispersed in the electrolyte or may even be mixed in an electrode. Specifically, if the uptaking agent is capable of functioning as the material of an electrode, it may be mixed in a lithium-manganese compound oxide, which constitutes a positive electrode in the present invention. While the uptaking agent may be either one of an organic compound and an inorganic compound, use may be made of, e.g., a lithium-nickel compound oxide, hydrogen-occluding alloy or carbon capable of occluding hydrogen. This kind or substance should preferably be implemented as powder so as to be mixed in the positive electrode or dispersed in the electrolyte.

The lithium-nickel compound oxide will be described hereinafter as a preferable hydrogen uptaking agent. The lithium-nickel compound oxide applicable to the present invention should be capable of uptaking hydrogen ions. For example, lithium-nickel compound oxides taught in the previously mentioned Laid-Open Publication Nos. 10-112318 and 7-235291 are unable to uptake hydrogen ions.

The lithium-nickel compound oxide consists of lithium, nickel and oxygen and may be any one of $LiNiO_2$, $Li_2NiO_2$, $LiNi_2O_4$, $Li_2Ni_2O_4$ and so forth with or without another element doped therein for the stabilization of the oxide, higher capacity or higher safely. For example, $LiNiO_2$ doped with another element is expressed as $LiNi_{1-x}M_xO_2$ ($0<x\leq0.5$) where M denotes a doped metal element, which is one or more metal elements selected from a group consisting of Co, Mn, Al, Fe, Cu and Sr. if desired, two or more doping metal elements may be used so long as the sum of the composition ratios of the elements is x. Among the above compounds, $LiNiO_2$ and $LiNi_{1-x}Co_xO_2$ are particularly desirable.

In the present invention, the Li/Ni ratio (Li/[Ni+M] ratio in the case of $LiNi_{1-x}M_xO_2$) of the lithium-nickel compound oxide may be slightly deviated from its stoichiometric value. The scope of the present invention includes such a condition as well.

The lithium-nickel compound oxide applicable to the present invention has a specific surface area X of $0.3\leq x\leq3.0$, so that the lithium-manganese compound oxide or the electrolyte is effectively protected from deterioration. Generally, the specific surface area is 5.0 or below. When the lithium-nickel compound oxide is to be mixed in the positive electrode, the specific surface area X should preferably be $0.3\leq x\leq3.0$ in order to implement slurry that is easy to handle and to coat the electrode. It is to be noted that the specific surface area refers to a surface area for a unit power weight ($m^2/g$) and is measured by a gas adsorption method.

Further, the lithium-nickel compound oxide applicable to the present invention may have a $D_{50}$ grain size of 40 μm or below. This is also successful to protect the lithium-manganese compound oxide or the electrolyte from deterioration. Generally, the $D_{50}$ grain size is 1 μm or above. When the lithium-nickel compound oxide is to be mixed in the positive electrode, the $D_{50}$ grain size should preferably be 3 μm or above in order to implement slurry that is easy to handle and to coat the electrode. The $D_{50}$ grain size corresponds to 50% of a weight sum and is measured by a laser beam diffusion method.

A specific procedure for producing the above lithium-nickel compound oxide will be described hereinafter. First, lithium may be implemented by lithium carbonate, lithium oxide, lithium nitride, lithium hydroxide or similar lithium compound. Also, nickel may be implemented by, e.g., nickel hydroxide, nickel oxide or nickel nitride. Both of lithium and nickel should preferably be pulverized to a suitable grain size. Particularly, the resulting nickel powder should preferably be sieved to the $D_{50}$ grain size.

Subsequently, the pulverized lithium and nickel are sufficiently mixed in a Li/Ni ratio that implements the target composition ratio of the lithium-nickel compound oxide. The lithium and nickel mixture is then sintered a 500° C. to 900° C. in the same manner as during the production of a lithium-manganese compound oxide. The sintered lithium-nickel compound oxide should preferably be further sieved to have the target surface area and target $D_{50}$ grain size.

The lithium-nickel compound oxide produced by the above procedure and capable of forming part of the positive electrode should preferably be mixed with the lithium-manganese compound oxide. Alternatively, such a compound oxide may be dispersed in the electrolyte.

While the hydrogen ion uptaking function of the lithium-nickel compound oxide has not been clearly accounted for, hydrogen ions are presumably substituted for lithium ions contained in the crystal of the compound oxide.

Assume that the lithium-nickel compound oxide is mixed with the lithium-manganese compound oxide and applied to the positive electrode. Also, assume a relation:

[LiMn compound oxide]:[LiNi compound oxide]=100−a:a

Then, by selecting a greater than or equal to 3, it is possible to reduce Mn to be eluded from the lithium-manganese compound oxide to the electrolyte and therefore to improve the cycle characteristic and capacity preservation characteristic. Further, if a is selected to be smaller than or equal to 45, an extremely safe nonaqueous electrolyte type secondary battery is achievable.

The lithium-manganese compound oxide applicable to the present invention as a positive electrode active substance will be described hereinafter. The lithium-manganese compound oxide is an oxide consisting of lithium, manganese and oxygen and may be, e.g., $LiMn_2O_4$ or similar lithium manganate having a spinel structure, $LiMn_2O_4$ or $LiMnO_2$. Among them, $LiMn_2O_4$ or similar lithium manganate with a spinel structure is particularly desirable. So long as the lithium-manganese compound oxide has a spinel structure, the Li/Mn ratio may be deviated from 0.5 and may be between 0.5 and 0.65, preferably between 0.51 and 0.6 or more preferably between 0.53 and 0.58. Likewise, the lithium-manganese compound oxide with a spinel Structure may have a [Lin+Mn]/[O] ratio deviated from 0.75.

The lithium-manganese compound oxide has a weight mean grain size usually ranging from 5 $\mu$m to 30 $\mu$m in order to facilitate the production of slurry, which implements the positive polarity, and to make the battery reaction uniform.

A specific procedure for producing the lithium-manganese compound oxide having the above composition will be described hereinafter. First, lithium (Li) may be implemented by, e.g., lithium carbonate, lithium oxide, lithium nitride, lithium hydroxide or similar lithium compound. Manganese (Mm) may be implemented by a manganese compound, e.g., electrolytic manganese dioxide (EMD), $Mn_2O_3$, $Mn_3O_4$, chemical manganese dioxide (CMD) or similar Mn oxide, or manganese carbonate, manganese oxalate or the like. The combination of electrolytic manganese dioxide and lithium carbonate is preferable because it allows the Li/Mn ratio to be easily guaranteed. Moreover, such a combination is preferable in the aspect of energy density for a unit volume dependent on a difference in bulk density, control over grain size, process and handling in the event of mass production, generation of toxic substances, and cost.

Before mixing Li and Mn, which are starting substances, it is preferable to pulverize each of Li and Mn to a suitable grain size. The Mn grain size is usually between 3 $\mu$m to 70 $\mu$m, preferably between 5 $\mu$m and 30 $\mu$m, while the Li grain size is usually 10 $\mu$m or below, preferably 5 $\mu$m or below and most preferably 3 $\mu$m or below.

The reaction that produces the Li-Mn compound oxide proceeds on the surface of the solid phase. Therefore, if Li and Mn are not sufficiently mixed or if the grain sizes are excessively large, the Li-Mn compound oxide with the target composition and target structure sometimes cannot be achieved. For example, assume that Li and Mn expected to produce lithium manganate having a spinel structure are not sufficiently mixed together or that the grain sizes are excessively large. Then, $Mn_2O_3$, $Mn_3O_4$, $Li_2MnO_3$, $Li_2Mn_4O_9$, $Li_4Mn_5O_{12}$ or similar phase is sometimes produced, lowering the voltage or the energy density of the resulting battery. In this sense, the grain sizes stated above desirably promote uniform reaction and thereby increase the contact area between Li and Mn. The powder may be controlled in grain size or may be shaped, if desired. Control over the grain sizes allows the Li—Mn compound oxide having the target grain size to be easily obtained.

Subsequently, Li and Mn with a molar ratio matching the target composition of the Li—Mn compound oxide are sufficiently mixed together and then sintered in an oxygen atmosphere. For oxygen, use may be made of pure oxygen or a mixture gas of oxygen and nitrogen, argon or similar inactive gas. At this instant, the oxygen partial pressure is about 50 torr to about 760 torr.

While the sintering temperature for producing lithium manganate with a spinel structure is usually between 400° C. and 1,000° C., it may be suitably selected to implement the desired phase. Specifically, it the sintering temperature is excessively high, $Mn_2O_3$, $Li_2MnO_3$ or similar unexpected phase is generated and makes the resulting battery voltage or the energy density short. Conversely, if the sintering temperature is excessively low, the relative oxygen concentration becomes excessively high or the powder density becomes excessively low This is undesirable from the high capacity standpoint. The sintering temperature should therefore be between 600° C. and 900° C., most preferably between 700° C. and 850° C.

While the sintering time maybe suitably controlled, it is usually between 6 hours and 100 hours, preferably between 12 hours and 48 hours. While the cooling rate may also be suitably controlled, it is preferably about 100° C. per hour at the final sintering step because rapid cooling is not desirable. The lithium-manganese compound oxide powder produced by such a procedure may be further sieved, as needed.

The positive electrode of the secondary battery of the present invention uses the above described lithium-manganese compound oxide with or without the hydrogen ion uptaking agent as an active substance. The uptaking agent may further additionally contain $LiCoO_2$ or similar compound generally known as a positive electrode, active substance. Further, the uptaking agent may contain $Li_2CO_3$ or similar additive for a safety purpose. A method of producing the positive electrode is open to choice. In an exemplary method, the lithium-manganese compound oxide powder and lithium-nickel compound oxide powder are mixed together (slurry) in a suitable dispersant, which dissolves a binder, together with, e.g., a conducting agent and a binder. After the resulting slurry has been coated on aluminum foil or similar collecting material and then dried, the collecting material is pressed or otherwise processed to form a film thereon.

The conducting agent is open to choice and may be implemented by, e.g., carbon black, acetylene black, natural or artificial graphite, carbon fibers or similar conventional substance. For the binder, use may be made of polytetrafluoroethylene (PTFE), polyvinylidene fluoride (PVDF) or similar conventional substances The electrolyte applicable to the present invention will be described hereinafter. The electrolyte, which the present invention uses, consists of a nonaqueous solvent and a supporting electrolyte dissolved therein. The solvent may be implemented by any one of carbonates, chlorinated hydrocarbon, ethers, ketones, nitriles and so forth. Preferably, the solvent consists of at least one of ethylene carbonate (EC), propylene carbonates (PC), γ-butyllactone or similar solvent whose dielectric constant is low, and at least one of diethyl carbonate (DEC), dimethyl carbonate (DMC), ethyl methyl carbonate (EGC), ester or similar solvent whose dielectric constant is high. The solvent should preferably be the combination of PC and MC or the combination of PC and EMC.

For the supporting electrolyte, use is made of at least one of $LiClO_4$, LiI, $LiPF_6$, $LiAlCl_4$, $LiBF_4$, $CF_3$, $SO_3Li$ and so forth. Generally, the nonaqueous solvents stated above cannot fully release water and are apt to absorb water during the production of a battery. Therefore, the nonaqueous solvents often react with such a small amount of water to thereby produce hydrogen ions. Experiments showed the $LiPF_6$ and $LiBF_4$, in particular, noticeably produced hydrogen ions and tended to make the electrolyte acidic.

The present invention effectively takes up hydrogen ions and is therefore most advantageous when applied to a battery system using an electrolyte that is apt to produce hydrogen ions. More specifically, the supporting electrolyte should preferably be implemented by $LiPF_6$ or $LiBF_4$ and should preferably have a concentration of, e.g., 0.8 M to 1.5 M.

As for a negative electrode active agent, use is made of lithium, lithium alloy, graphite capable of occluding and releasing lithium, or amorphous carbon or similar carbon.

The separator may be implemented by any one of woven cloth, glass fibers, porous synthetic resin film or the like. For example, a porous film of polypropylene or polyethylene is desirable from the standpoint of thinness, broadness, strength, and resistance.

While the material of the casing also included in the present invention is not limited, it may be implemented by conventional resin films or laminate films by way of example. When the films are bonded by heat, it is preferable to use laminate films configured such that their thermo-bonding films are positioned at the sealing side (generating element side). For example, use may be made of a trilayer laminate film made up of a heat-resistant resin film laminated on one surface of metal foil and a thermo-bonding resin film laminated on the other surface of the metal foil. Alternatively, use may be made of a multilayer laminate film having a heat-resistant resin layer between metal foil and a thermo-bonding resin or having an adhesive layer between metal and thermo-bonding resin.

The metal foil may be implemented by aluminum, copper, stainless steel, nickel, gold or silver by way of example. Among them, aluminum is particularly desirable. For the heat-resistant resin film, use may be made of polyethylene terephthalate or similar polyester or nylon by way of example. The thermo-bonding resin film may be implemented by, e.g., ionomer, polyethylene or polypropylene with or without maleic unhydride or similar acidic group grafted thereto or copolymerized therewith.

For the films constituting the casing, use may alternatively be made of films each consisting or a film of polyethylene terephthalate or similar heat-resistant resin and the previously mentioned thermo-bonding resin laminated on the film either directly or via adhesive. Further, each film may be implemented as a single film formed of thermo-bonding resin.

The illustrative embodiment will be described more specifically in relation to specific estimation tests although the estimation tests are not limitable, but are only illustrative. In the estimation tests, the surface area and $D_{50}$ grain size were measured by Quanta Sorb available from Quanta Chrome Inc. and FRA available from Micro Trac Inc., respectively.

Estimation Test 1

To produce lithium manganate, lithium carbonate ($Li_2CO_3$) and electrolytic manganese diode (EMD) were used as starting substances. Before the mixing of the two starting substances, $Li_2CO_3$ was pulverized while EMD was sieved in order to promote reaction and to produce lithium manganate having the target grain size. When lithium manganate is expected to form part the material of the positive electrode of a battery, the weight mean particle size thereof should preferably be 5 $\mu$m to 30 $\mu$m in consideration of the balance between uniform reaction, easy production of slurry, safety, and so forth. In light of this, EMD, like lithium manganate, was provided with the grain size of 5 $\mu$m to 30 $\mu$m.

On the other hand, $Li_2CO_3$ should preferably have a grain size of 5 $\mu$m or below in order to guarantee uniform reaction. For this reason, $Li_2CO_3$ was pulverized to a $D_{50}$ grain size of 1.4 $\mu$m.

EMD and $Li_2O_3$ provided with a particular grain size each were mixed such that the Li/Mn ratio was 1.05/2. The resulting mixture was sintered at 800° C. in an oxygen flow atmosphere. Subsequently, lithium manganate particles whose particle size was 1 m or below were removed by an air sieve The lithium manganate particles left had a specific surface area of about 0.9 $m^2$/g. Further, the powder had a tap density of 2.17 g/cc, a true density of 4.09 g/cc, a $D_{50}$ particle size of 17.2 $\mu$m, and a lattice constant of 8.227 Å.

For the hydrogen ion uptaking agent, $LiNi_{0.9}Co_{0.1}O_2$ having a specific surface area of 1.7 $m^2$/g was prepared as an example of a lithium-nickel compound oxide.

Figure 3:
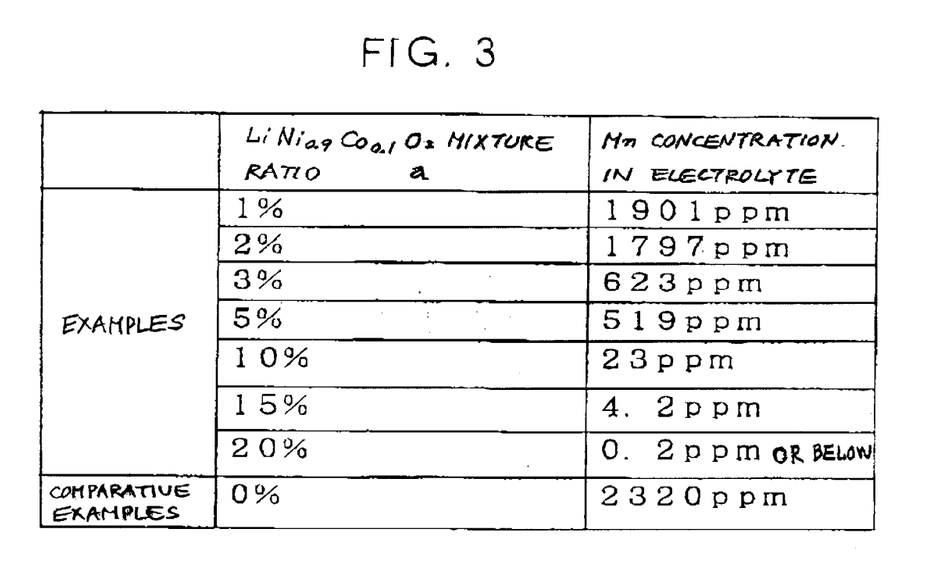
FIG. 3 is a table listing the results of analysis of Mn ion concentrations in an electrolyte.

Assuming a weight ratio of 100−a:a, then lithium manganese and $LiNi_{0.9}Co_{0.1}O_2$ prepared as stated above were such that a was 0 (Comparative Example), 1, 2, 3, 5, 10, 15 or 20. 5 g of each of such powder mixtures was introduced in a solvent consisting of propylene carbonate (PC) and dimethyl carbonate (DMC) (50:50 (volume %)) in order to prepare an electrolyte. 100 cc of each electrolytes was introduced in a hermetic vessel. Such vessels each containing particular one of the solvents were-heated to 800° C. and left for twenty days. Subsequently, the electrolytes ware produced from the vessels in order to analyze Mn ion concentrations by ICP. FIG. 3 lists the results of analysis.

As FIG. 3 indicates, Mn was eluted more in the electrolyte as the mixture ratio of $LiNi_{0.9}Co_{0.1}O_2$ increased, enhancing the hydrogen ion uptaking effect. Presumably, therefore, the stability of the positive electrode active substance increases even when a battery is used in a high-temperature environment.

Estimation Test 2

Figure 4:
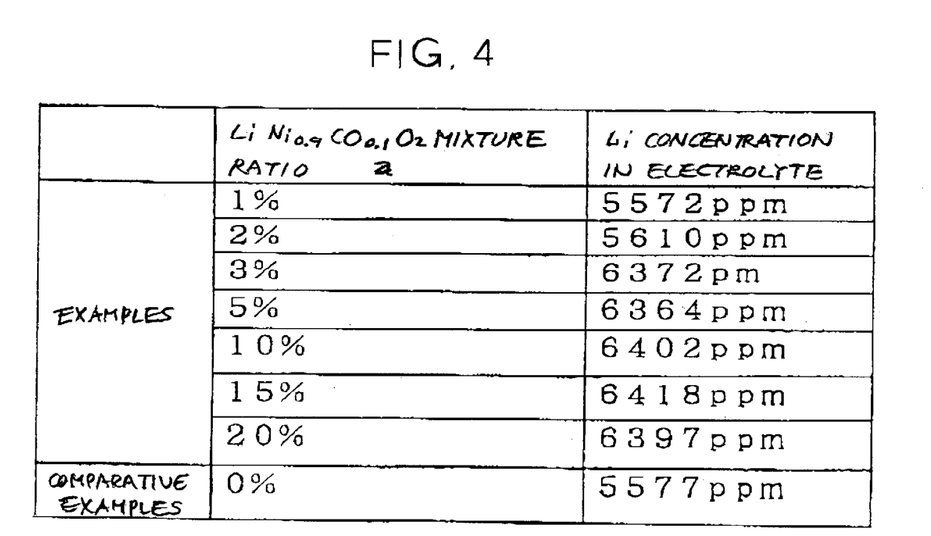
FIG. 4 is a table listing the results of analysis of Li ion concentrations in an electrolyte.

The hermetic vessels prepared in Estimation Test 1 were heated to 80° C. and left for twenty days. Subsequently, the electrolytes were produced from the vessels in order to analyze Li ion concentrations by atomic absorption spectroscopy. FIG. 4 lists the results of analysis FIG. 4 suggests that a decrease in the Li concentration of the electrolyte can be reduced if the mixture ratio of $LiNi_{0.9}Co_{0.1}O_2$ is increased. This is because a mixture solvent of propylene carbonate (PC) and dimethyl carbonate (DMC) (50:50 (volume percent)) and containing $LiPF_6$ (concentration of 1 M) is about 6,400 ppm.

The results of Estimation Tests 1 and 2 indicate that the lithium-nickel compound oxide reduces the elution of Mn into the electrolyte and therefore a change in Li ion concentration in the electrolyte. Assume one-third of an Mn concentration or less without the lithium-nickel compound oxide and [lithium manganese compound oxide]:[lithium-nickel compound oxide]=100:a (weight %). Then, the mixture ratio of the lithium-nickel compound oxide is a≧3. In addition, the results of Estimation Test 2 shows that when a≧3 holds, the Li concentration in the electrolyte remains above 95% even when left for twenty days at 80° C. The mixture ratio of a≧3 is therefore particularly desirable.

Estimation Test 3

Lithium manganate produced in the same manner as in Estimation Test 1 was used as a lithium-manganese compound oxide. As for a lithium-nickel compound oxide, a 2320 coil cell was produced by use of $LiNi_{0.8}Co_{0.2}O_2$ having a specific surface area of 1.7 m²/g. As for a positive electrode, lithium manganese, $LiNi_{0.8}Co_{0.2}O_2$, a conducting agent and PTFE were mixed in a ratio of 72:8:10:10 (weight %) (a=10), kneaded, rolled to a thickness of 5 mm, and then punched. The conducting agent was implemented by carbon black. A negative electrode was formed of Li and provided with a diameter of 14 mm and a thickness of 1.5 mm while a separator was implemented by a 25 µm thick, porous PP film. A mixture solvent of ethylene carbonate (EC) and dimethyl carbonate (DMC) (50:50 (volume %) and containing $LiBF_4$ (concentration of 1 M) was used as an electrolyte.

For comparison, there was produced a coin cell identical with the above coin cell except that its positive electrode contained lithium manganate, a conducting agent and PTFE in a ratio of 80:10:10 (weight %) and did not contain $LiNi_{0.8}Co_{0.2}O_2$ (comparative example).

Figure 5:
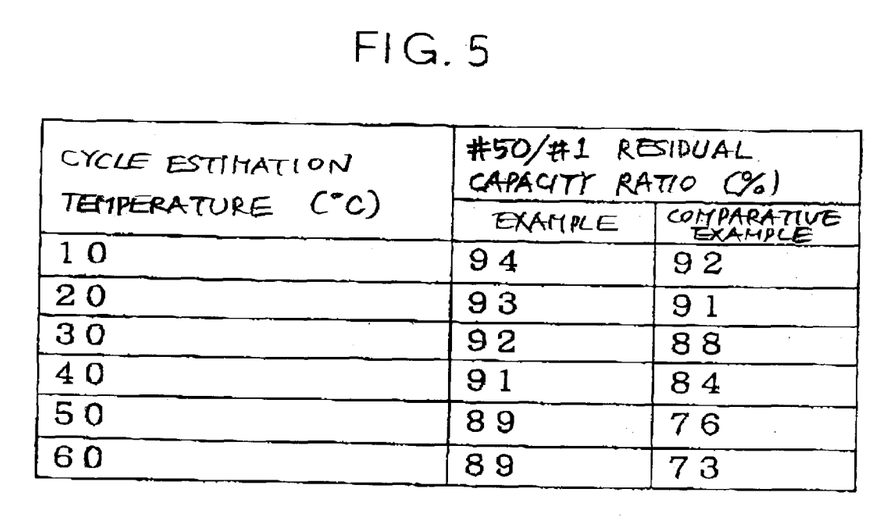
FIG. 5 is a table showing a relation between a cycle estimation temperature and a #50/#1 residual capacity ratio.

Charge-discharge cycle tests were conducted with the above two coin cells under the following conditions. A constant current of 0.5 mA/cm² was used for both of charging and discharging. The charge-discharge voltage ranged from 3.0 V to 4.5 V vs Li. The estimation temperature was varied from 10° C. to 60° C. on a 10° C. basis. FIG. 5 lists #50/#1 residual capacity ratios (%) (ratios of residual capacity measured at the fiftieth cycle to residual capacity measured at the first cycle) with respect to various cycle estimation temperatures . As FIG. 5 indicates, the coin cell of the example has a higher residual capacity ratio than the comparative example even when the cycle temperature is raised.

Estimation Test 4

Lithium manganate produced in Estimation Test 1 was used as a lithium-manganese compound oxide. As for a lithium nickel compound oxide, use as made of $LiNi_{0.8}Co_{0.2}O_2$ having a specific surface area of 1.7 m₂/g. A casing was implemented by aluminum laminate films.

First, lithium manganese, $LiNi_{0.8}Co_{0.2}O_2$ and a conducting agent were mixed in a dry condition and then evenly dispersed in a N-methyl-2-pyroridone (NMP) in which PVDF was dissolved as a binder, thereby preparing slurry. The conducting agent was implemented by carbon black. The slurry was coated on 25 µm thick aluminum foil, and then NMP was evaporated to produce a positive electrode sheet. The solid ratio of the positive electrode sheet was lithium manganese:$LiNi_{0.8}Co_{0.2}O_2$:conducting agent:PVDF=72:8:10:10 (weight %) (a=10).

To produce a negative electrode sheet, carbon and PVDF were mixed in a ratio of 90:10 (weight %) and then dispersed in NMP. The resulting mixture was coated on 20 µm thick copper foil.

Subsequently, the positive and negative electrode sheets were wound round an oval core with the intermediary of a 25 µm thick, porous film separator formed of polyethylene. The resulting assembly was subjected to heat pressing so as to produce a thin, oval electrode winding.

Two pieces were cut away from a laminate film made up of 70 µm thick polypropylene resin (seal layer), 20 µm thick polyethylene terephthalate, 50 µm thick aluminum and 20 µm thick polyethylene terephthalate, which were sequentially laminated in this order. The two pieces each were formed with a recess including a bottom and sides complementary to the contour of the winding. The two pieces were then positioned face-to-face in such a manner as to embrace the winding and then bonded by heat at their sides. As a result, the secondary battery with the casing (1a and 1b) shown in FIGS. 1 and 2 were completed. Before the last side of the casing was bonded by heat, the winding was impregnated with an electrolyte. The winding with the electrolyte corresponds to the heat generating element 2, FIG. 2. The electrolyte was implemented by a mixture solvent of propylene carbonate (PC) and diethyl carbonate (DEC) (50:50 (weight %)) The last side was sealed in a depressurized condition.

For comparison, there was produced a secondary battery with a casing identical with the above battery except that its positive electrode did not contain $LiNi_{0.8}Co_{0.2}O_2$, and that the solid ratio was lithium manganate:conducting agent:PVDF=80:10::10 (weight %) (comparative example).

Figure 6:
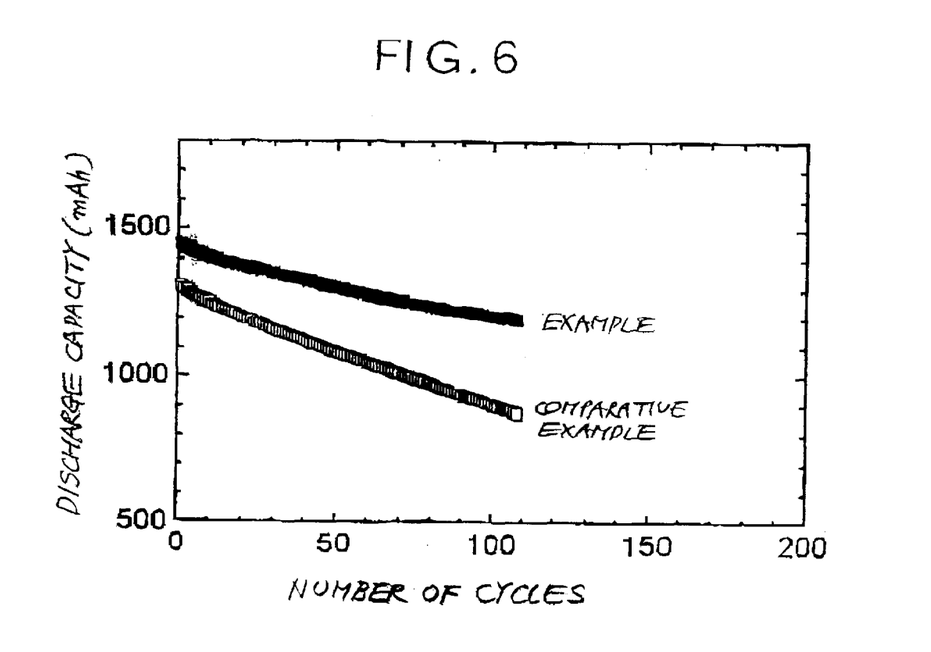
FIG. 6 is a graph comparing a specific example of the illustrative embodiment and a comparative example with respect to 55° C. discharge capacity and a cycle characteristic.

Charge-discharge cycle tests were conducted with the two secondary batteries under the following conditions. Charging was effected with a current of 500 mA and a voltage of up to 4.2 V while discharging was effected with a current of 1,000 mA and a voltage of up to 3.0 V. FIG. 6 compares the cycle characteristics of the 55° C. discharge capacity particular to the example and comparative example. It will be seen that the deterioration of capacity is smaller in the example of the illustrative embodiment than in the comparative example after the repeated charge-discharge cycle.

Estimation Test 5

Lithium manganate produced in the same manner as Estimation Test 1 was used as a lithium-manganese compound oxide. As for a lithium-nickel compound oxide or hydrogen ion uptaking agent, use was made of $LiNi_{0.8}CO_{0.15}Al_{0.05}O_2$ having a specific surface area of 1.7 m²/g was used.

Figure 7:
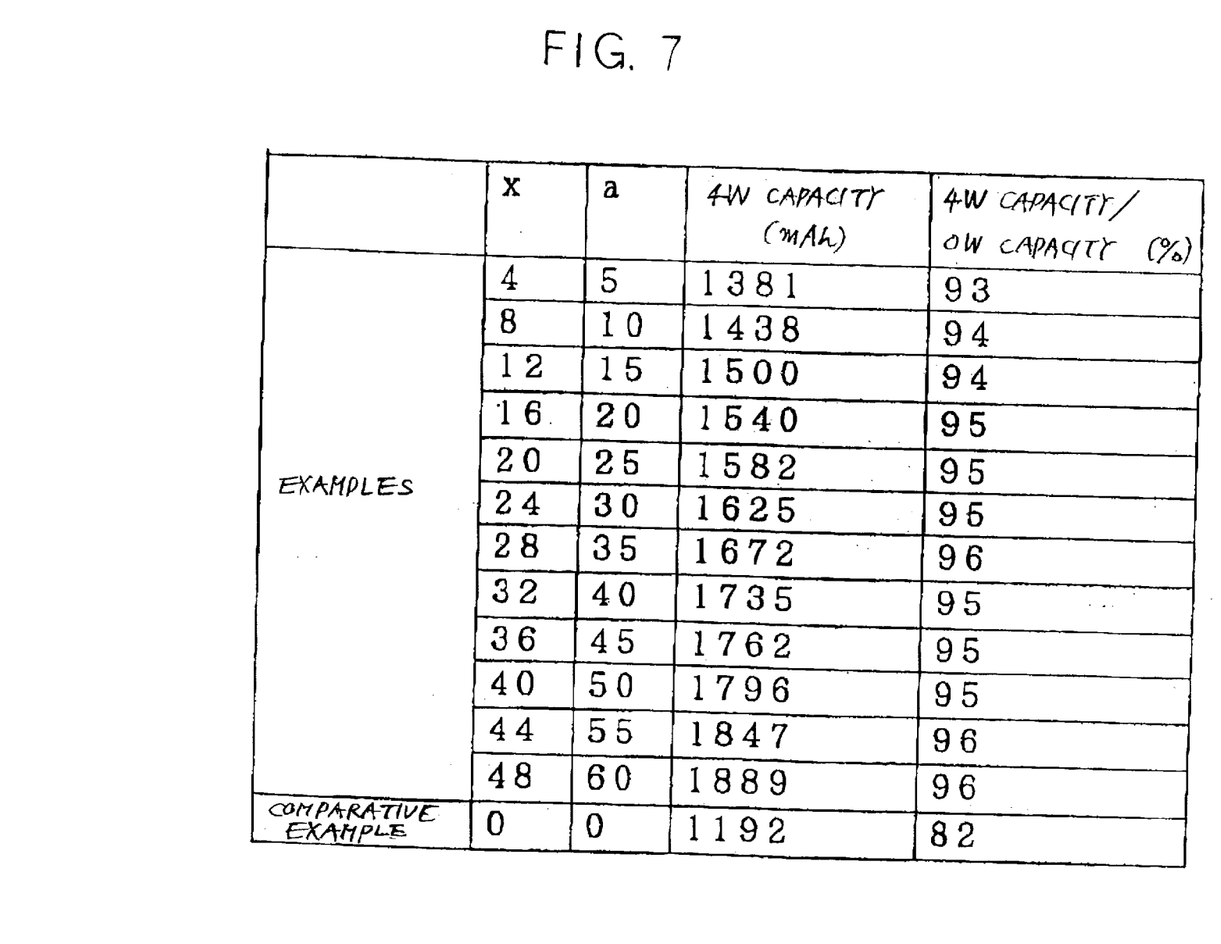
FIG. 7 is a table showing a relation between specific examples of the illustrative embodiment and a comparative example with respect to capacity determined by immediate discharge and capacity determined by discharge after twenty-eight days.

First, lithium manganate, $LiNi_{0.8}Co_{0.15}Al_{0.05}O_2$ and a conducting agent was mixed in a dry condition and then evenly dispersed in a binder, thereby preparing slurry. The binder was implemented by N-methyl-2-pyroridone (NMP) in which PVDF was dissolved. The slurry was coated on a 25 µm thick aluminum foil, and then NMP was evaporated to produce a positive electrode sheet. The positive electrode sheet had a solid ratio of lithium manganate: $LiNi_{0.8}Co_{0.15}Al_{0.05}O_2$:conduction agent:PVDF=80-X:X:10:10 (weight %). FIG. 7 lists various values of X (weight %) used for tests. FIG. 7 shows the results of tests together with the values of a (=X 100/80; identical in meaning with the previous a). A comparative example shown in FIG. 7 corresponds to x=0 (a=0).

To produce a negative electrode sheet, carbon and PVDF were mixed in a ratio of 90:10 (weight %), dispersed in NMP, and then coated on 20 µm thick copper foil.

An electrolyte was implemented by a mixture solvent of propylene carbonate (PC) and diethyl carbonate (DEC) (50:50 (weight %)) and containing a supporting electrolyte implemented by 1 M of $LiPF_6$. For a separator, use was made of 25 m thick, porous film formed of polyethylene.

Capacity preservation tests were conducted with the secondary batteries produced by the above procedure. Charging was effected with a constant current of 500 mA up to a voltage of 4.2 V and was then effected with a constant voltage of 4.2 V for 2 hours. Subsequently, discharge capacity was measured in a condition wherein the batteries were immediately caused to discharge at room temperature and a condition wherein they were left at room temperature for twenty-eight days and then caused to discharge. For the measurement, a current of 500 mA and a cutoff voltage of 3.0 V were used in a room temperature environment.

FIG. 7 lists capacities measured after twenty-eight days (labeled 4 W Capacity) and the ratios thereof to capacities immediately measured (labeled 0 W Capacity). It will be seen that the example of the embodiment preserves a greater capacity than the comparative example even when left for twenty-eight days. In addition, the high capacity, lithium-nickel compound oxide successfully increases the capacity of the secondary battery.

Estimation Test 6

Figure 8:
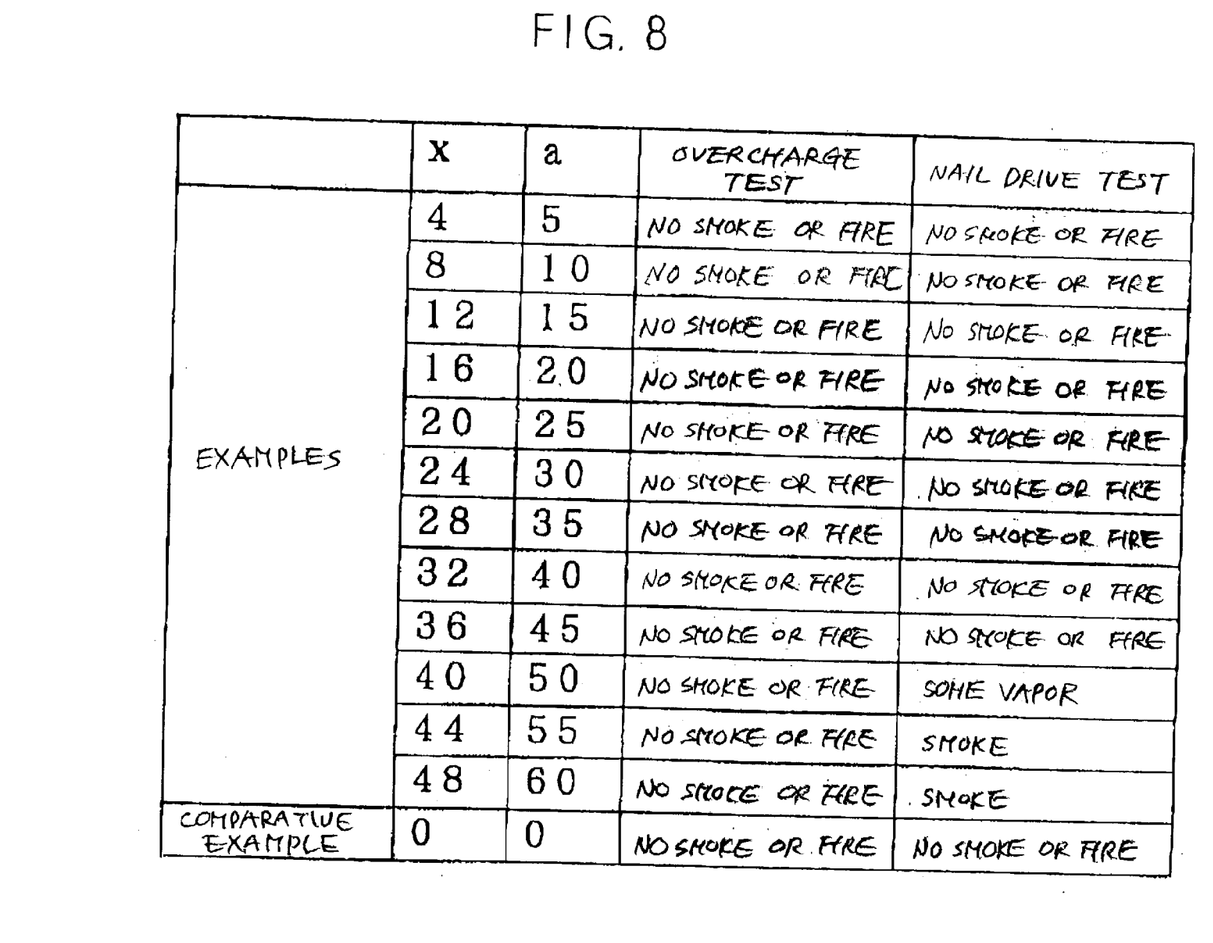
FIG. 8 is a table comparing specific examples of the illustrative embodiment and a comparative example with respect to safety.

Safety tests were conducted with the secondary battery produced in Estimation Test 5. FIG. 8 shows the results of the safety tests. When the positive electrode active agent is implemented mainly by lithium manganate, differences are difficult to see as to a short-circuit test, a hot box and other safety estimation items because lithium manganate is higher in safety than Co. To make the above differences conspicuous, secondary batteries were produced with a positive electrode density as high as 3.1 g/cm$^3$. Such a severe condition is important in view of the future tendency toward higher capacity. For the estimation of safety, an overcharge test and a nail drive test were used. The overcharge test was conducted under the conditions of 12 V and 3 C. The nail drive test was such that a nail was driven into a battery so as to forcibly short it. The nail drive test was effected in accordance with UL-1642 by using 4 mm nails.

As for the overcharge test, no smoke or fire was observed even when x was 56 or above. As for the nail drive test, some vapor or fire was observed when x was 40 or above, From the safety standpoint, therefore, x should preferably be 36 or below while a should preferably be smaller than or equal to 45.

Estimation Test 7

Lithium manganate produced in the same manner as in Estimation Test 1 and $LiNi_{0.8}Co_{0.1}Mn_{0.1}O_2$, which is a specific lithium-nickel compound oxide, were mixed. Again, assuming a mixture ratio of 100−a:a (weight %), a was selected to be 0 (comparative example), 3, 5, 10, 15, 20, 30 and 35. Electrolytes each consisting of ethylene carbonate (EC) and diethyl carbonate (DEC) (50:50 (weight %) and containing 5 g of particular one of the above mixtures and 10 cc of $LiPF_6$ (concentration of 1 M) were put in hermetic vessels. There were used seven different kinds of $LiNi_{0.8}Co_{0.1}Mn_{0.1}O_2$ respectively having specific surface areas of 3.0 m$^2$/g, 2.36 m$^2$/g, 1.50 m$^2$/g, 0.71 m$^2$/g, 0.49 m$^2$/g, 0.30 m$^2$/g and 0.25 m$^2$/g.

Figure 9:
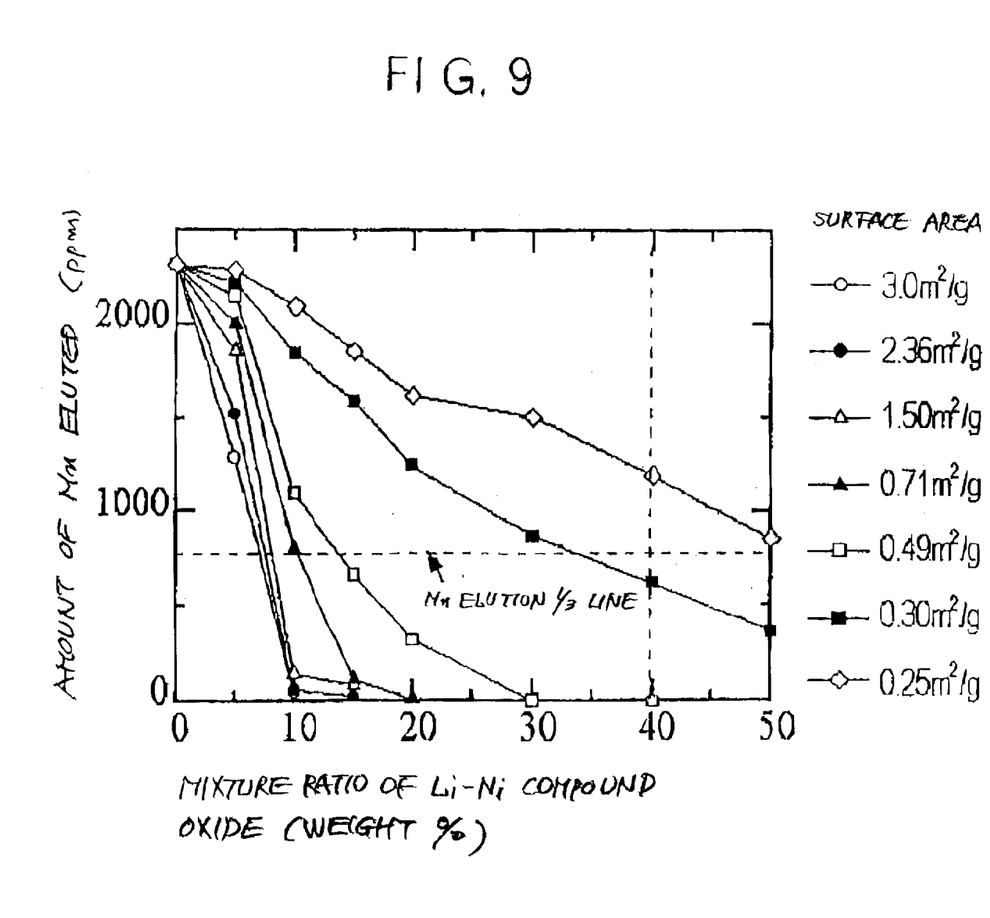
FIG. 9 is a graph showing a relation between the specific surface area and the Mn elution of a lithium-nickel compound oxide.

The hermetic vessels were heated to 80° C. and left for twenty days. Subsequently, the electrolytes were produced form the vessels in order to analyze Mn ion concentrations by ICP. FIG. 9 shows the results of analysis. As FIG. 9 indicates, the elution of Mn into the electrolyte is more reduced as the specific surface area increase.

For the safety purpose, a included in the ratio of (lithium manganate):(lithium-nickel compound oxide)=100−a:a (weight %) should preferably be smaller than or equal to 45, as stated earlier. On the other hand, FIG. 9 indicates that for the specific surface area is 0.25 m$^2$/g the amount of Mn to be eluted cannot be reduced to less than one-third of the amount of Mn elution of 2,320 ppm, which occurs without the lithium-nickel compound oxide, unless the mixture ratio of the lithium-nickel compound oxide is increased to 50%. It is therefore preferable that the lithium-nickel compound oxide has a specific surface area X greater than 0.3 m$^2$/g.

Estimation Test 8

Lithium manganate produced in the same manner as in Estimation Test 1 was used as a lithium-manganese compound oxide. As for a lithium-nickel compound oxide, there were prepared five different kinds of $LiNi_{0.8}Co_{0.1}Mn_{0.1}O_2$ powder respectively having specific surface areas of 4.5 m$^2$/g, 3.2 m$^2$/g, 3.0 m$^2$/g, 1.50 m$^2$/g and 0.30 m$^2$/g. The above Lithium manganate and $LiNi_{0.8}Co_{0.1}Mn_{0.1}O_2$ and carbon black, which is a specific conducting agent, were mixed in a dry condition. The resulting mixture was added to a binder N-methyl-2-pyroridone (NMP), in which PVDF was dissolved, and then evenly dispersed by kneading so as to produce slurry. The mixture ratio of lithium manganese, $LiNi_{0.8}Co_{0.1}Mn_{0.1}O_2$,conducting agent, PVDF and NMP was 30:10:5:5:50 (weight %)

Figure 10:
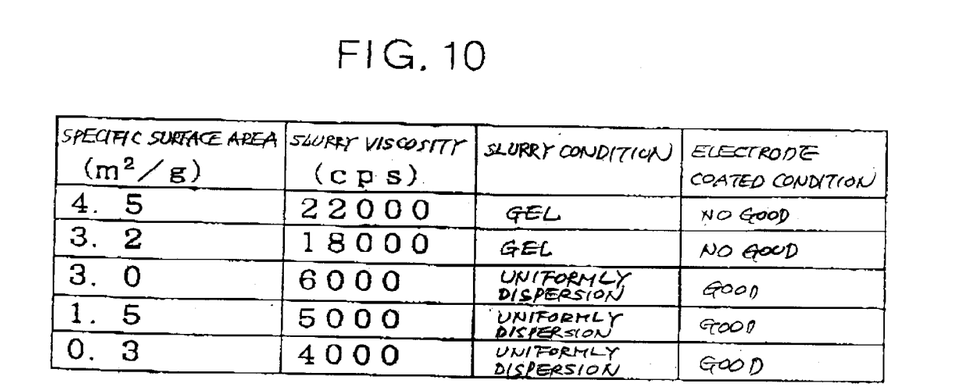
FIG. 10 is a graph showing a relation between the specific surface area of a lithium-nickel compound oxide and the viscosity and condition of a slurry and the coated condition of an electrode.

After the measurement of viscosity using a Brookfield viscometer, the slurry was uniformly coated on 25 µm thick aluminum foil. NMP was then evaporated to complete a positive electrode sheet. FIG. 10 shows a relation between the specific surface area of the lithium-nickel compound oxide and the viscosity and state or the slurry and the coated condition of the electrode. It will be seen that when the specific surface area is 3.2 m$^2$/g or above, the slurry gels and is difficult to coat the electrode. Therefore, the specific surface area of the lithium-nickel compound oxide should preferably be 3.0 m$^2$/g or below. Also, to reduce the elution of Mn into the electrolyte, the $D_{50}$ grain size should preferably be 40 µm or below and, to promote easy coating, 3 µm or above.

To summarize the results of Estimation Test 8, the optimal specific surface area X of the lithium-nickel compound oxide to be mixed lies in the range of $0.3 \leq x \leq 3.0$ (m$^2$/g) from the Mn elution standpoint and from the slurry coating and printing standpoint. Also, as for the lithium-nickel compound oxide to be mixed, the optimal $D_{50}$ grain size should be 3 µm or above, but 40 µm or below from the Mn dilution standpoint and the slurry coating and printing standpoint. Further, assuming that [LiMn compound oxide] :[LiNi compound oxide] is 100−a:a, then a should preferably lie in the range of $3 \leq a \leq 45$ from the Mn dilution standpoint and safety standpoint.

Estimation Test 9

Figure 11:
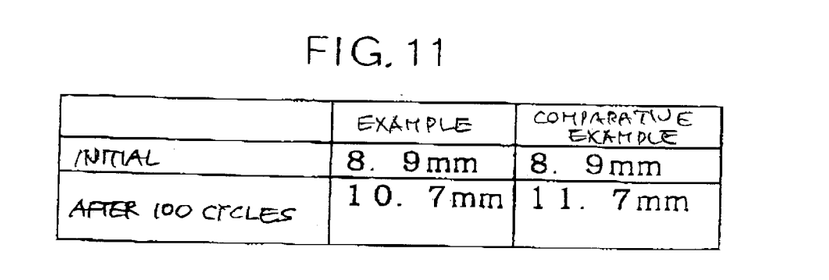
FIG. 11 is a table comparing a specific example of the illustrative embodiment and a comparative example with respect to a change in the thickness of a battery ascribable to a repeated charge-discharge cycle.

The initial thickness of the battery of the illustrative embodiment produced in Estimation Test 4 and that of the battery of the comparative example were measured. Also, the thickness was measured after 100 cycles of charge-discharge cycle test effected at 55° C. Charging was effected with a current of 500 mA and up to a voltage of 4.2 V while discharging was effected with a current of 1,000 mA, and up to a voltage of 3.0 V. FIG. 11 shows the results of measurement. It will be seen that the battery of the illustrative embodiment has its contour swelled less than the contour of the battery of the comparative example after the charge-discharge cycles.

Estimation Test 10

Figure 12:
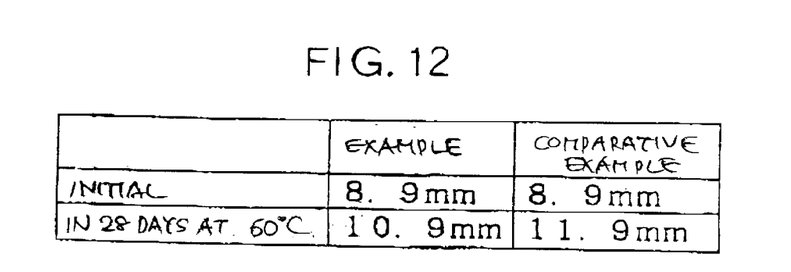
FIG. 12 is a table comparing a specific example of the illustrative embodiment and a comparative example with respect to a change in the thickness of a battery ascribable to storage.

How the battery of the illustrative embodiment and that of the comparative example swell was determined by holding then at 60° C. First, the initial thickness of the two batteries was measured. The batteries were then charged by a constant current of 500 mA up to a voltage of 4.2 V and then charged by a constant voltage of 4.2 V for 2 hours. Thereafter, the batteries were left at 60° C. for twenty-eight days. The resulting thickness of each battery is shown in FIG. 12. It will be seen that the battery of the illustrative embodiment swells less than the battery of the comparative example.

In summary, in accordance with the present invention, a secondary battery is capable of effectively reducing a hydrogen ion concentration in an electrolyte and therefore reducing the elution of Mn from a lithium-manganese oxide, which is a positive electrode active substance, as well as a change in the Li concentration in the electrolyte. This successfully improves a charge-discharge cycle, particularly a charge-discharge life at high temperatures, and a capacity preservation characteristic. In addition, the battery swells little despite the charge-discharge cycle or storage.

Various modifications will become possible for those skilled in the art after receiving the teachings of the present disclosure without departing from the scope thereof.

What is claimed is:

1. In a nonagueous electrolyte type secondary battery comprising an electricity generating element, which includes at least a positive electrode comprising a lithium-manganese compound oxide, a negative electrode, an electrolyte containing a supporting electrolyte comprising a compound selected from the group consisting of $LiPF_6$ and $LiBF_4$ and a separator, and films encasing said electricity generating element, a composition causing said electrolyte to react with water to thereby produce hydrogen ions, and hydrogen ion uptaking agent so positioned as to contact said electrolyte existing in said secondary battery, wherein the hydrogen ion uptaking agent bifunctions as a positive electrode active substance, and is mixed in the positive electrode together with the lithium-manganese compound oxide, and comprises a lithium-nickel compound having a hydrogen ion uptaking function; with a specific surface area X lying in a range of $0.3 \leq x \leq 3.0$ $(m^2/g)$.

2. A secondary battery as claimed in claim 1, wherein the ratio in weight percent of lithium-manganese compound oxide to lithium-nickel compound oxide 100−a:a, where a is $3 \leq a \leq 45$.

3. A secondary battery as claimed in claim 1, wherein the lithium-nickel compound oxide has a $D_{50}$ particle size of 40 μm or below, but 3 μm or above.

4. A secondary battery as claimed in claim 3, wherein the ratio in weight percent of lithium-manganese compound oxide to lithium-nickel compound oxide 100−a:a, where a is $3 \leq a \leq 45$.

* * * * *